(12) United States Patent
Hurtado Gonzalez

(10) Patent No.: US 11,884,568 B2
(45) Date of Patent: Jan. 30, 2024

(54) RECYCLING OF SODIUM SULFATE IN STARCH PROCESSING

(71) Applicant: CORN PRODUCTS DEVELOPMENT, INC., Westchester, IL (US)

(72) Inventor: Carlos Eduardo Hurtado Gonzalez, Bridgewater, NJ (US)

(73) Assignee: Corn Products Development, Inc., Bridgewater, NJ (US)

( * ) Notice: Subject to any disclaimer, the term of this patent is extended or adjusted under 35 U.S.C. 154(b) by 323 days.

(21) Appl. No.: 17/260,470

(22) PCT Filed: Aug. 13, 2019

(86) PCT No.: PCT/US2019/046354
§ 371 (c)(1),
(2) Date: Jan. 14, 2021

(87) PCT Pub. No.: WO2020/036960
PCT Pub. Date: Feb. 20, 2020

(65) Prior Publication Data
US 2021/0269345 A1 Sep. 2, 2021

(30) Foreign Application Priority Data
Aug. 14, 2018 (WO) ................ PCT/CN2018/100350

(51) Int. Cl.
*C02F 9/02* (2006.01)
*C02F 9/00* (2023.01)
(Continued)

(52) U.S. Cl.
CPC .................. *C02F 9/00* (2013.01); *C01D 5/16* (2013.01); *C02F 1/004* (2013.01); *C02F 1/283* (2013.01); *C02F 1/32* (2013.01); *C02F 1/42* (2013.01); *C02F 1/441* (2013.01); *C02F 1/442* (2013.01); *C02F 3/1268* (2013.01); *C02F 2001/425* (2013.01); *C02F 2101/101* (2013.01);
(Continued)

(58) Field of Classification Search
None
See application file for complete search history.

(56) References Cited

U.S. PATENT DOCUMENTS 5,338,457 A * 8/1994 Capozzola ........... B01D 61/026
210/651
7,501,065 B1 * 3/2009 Bader .................. B01D 61/364
166/371
(Continued)

FOREIGN PATENT DOCUMENTS

| CN | 102232061 | 11/2011 |
| CN | 103058227 | 4/2013 |
| CN | 104118961 C | 10/2014 |

OTHER PUBLICATIONS

Bargeman, G., et al: "Nanofiltration as energy-efficient solution for sulfate waste in vacuum salt production", Desalination, Elsevier, Amsterdam, NL, vol. 245, No. 1-3, Sep. 15, 2009, pp. 460-468.

*Primary Examiner* — Chester T Barry

(57) ABSTRACT

This specification discloses a system and method for treating process water from a starch process, and more specifically, recycling a concentrated sodium sulfate solution, obtained from the process water to the starch process.

17 Claims, 1 Drawing Sheet

(51) Int. Cl.
*C01D 5/16* (2006.01)
*C02F 1/00* (2023.01)
*C02F 1/28* (2023.01)
*C02F 1/32* (2023.01)
*C02F 1/42* (2023.01)
*C02F 1/44* (2023.01)
*C02F 3/12* (2023.01)
*C02F 101/10* (2006.01)
*C02F 103/32* (2006.01)

(52) U.S. Cl.
CPC ...... *C02F 2103/32* (2013.01); *C02F 2209/08* (2013.01); *C02F 2301/066* (2013.01); *C02F 2301/08* (2013.01); *C02F 2303/18* (2013.01); *C02F 2303/24* (2013.01)

(56) References Cited

U.S. PATENT DOCUMENTS

| | | |
|---|---|---|
| 8,741,143 B2 | 6/2014 | Evans et al. |
| 2013/0206692 A1* | 8/2013 | Zhang .................. C02F 9/00 210/151 |
| 2017/0088451 A9* | 3/2017 | Gonzalez ............... C02F 1/442 |
| 2017/0121189 A1* | 5/2017 | Rahman ................. C02F 1/441 |
| 2018/0305221 A1* | 10/2018 | Yin ....................... C02F 1/048 |
| 2020/0009229 A1* | 1/2020 | Callewaert ............. C12P 21/02 |

* cited by examiner

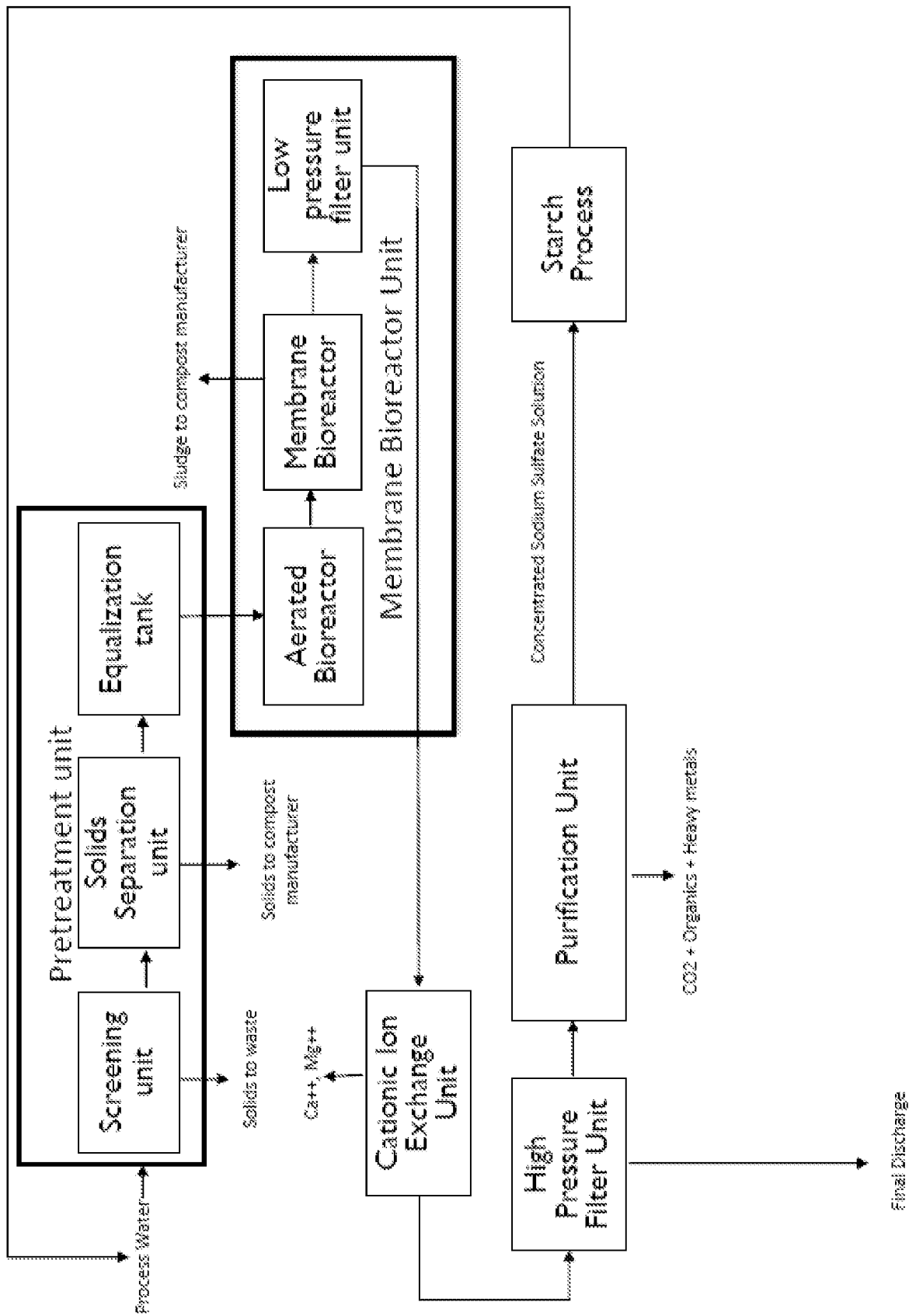

RECYCLING OF SODIUM SULFATE IN STARCH PROCESSING

CROSS-REFERENCE TO RELATED APPLICATIONS

This application is a US National Stage under 35 USC § 371 of International Application No. PCT/US2019/46354, filed Aug. 13, 2019, which claims priority to International Patent Application Serial Number PCT/CN2018/100350, filed on Aug. 14, 2018, which are both hereby incorporated by reference herein in their entirety.

This specification discloses a system and method for treating process water from a starch process, and more specifically, recycling a concentrated sodium sulfate solution, obtained from the process water to the starch process.

Sodium sulfate may be added as a processing aid to a starch process, such as a hydroxypropylation process. The sodium sulfate is not consumed during the process. Instead, it remains in the process water drained during starch product recovery. Sodium sulfate, while useful in the starch process, is a regulated pollutant. So it must be removed from the process water before the water can be discharged from the starch processing plant. Being useful in the starch process, however, it is also desirable to recover the sodium sulfate so that it can be recycled into the starch process.

The process water, however, also typically includes solid and dissolved starch material, and dissolved cations, which if not handled properly, can foul a water treatment process and contaminate the sodium sulfate. United States Publication No. 2017-0088451, which is entirely incorporated by reference into this application, discloses a system for removing contaminants from a starch hydroxypropylation process water and for recrystallizing substantially pure sodium sulfate. Crystallization, however, is energy intensive: it requires cooling the sodium sulfate solution to between 0° and 5° C., and centrifuging the cooled solution to recover the crystals. So there is a need for a less energy intensive system and method for obtaining a useful sodium sulfate end product from the process water of a starch process.

BRIEF DESCRIPTION OF THE FIGURES

FIG. 1 is a block diagram depicting an illustrative embodiment of the system.

One embodiment is directed to a system comprising a membrane bioreactor unit coupled to a starch process; a cationic ion exchange unit coupled to the membrane bioreactor unit; and a high pressure filtration unit coupled to the cationic ion exchange unit and the starch process. (In various embodiments described in this specification one element is coupled to another if there is a direct or indirect connection between the two elements that allows the process water to flow between those elements.) In other embodiments the system further comprises one or more storage tanks coupled between the high pressure filtration system and the starch process. Some embodiments are directed to a system comprising a membrane bioreactor unit comprising one or more of a membrane bioreactor membrane, a low pressure filtration unit, and an aerated bioreactor unit. In one or more embodiments a membrane bioreactor membrane has one of a tubular, spiral, hollow fiber, or flat sheet configuration. Still other embodiments are directed to a system comprising a low pressure filtration unit having a filter with a pore size of between 1 micron to 0.02 microns, or from 0.7 microns to 0.25 microns, or from 0.5 microns to 0.03 microns, or from 0.4 microns to 0.03 microns or having a pressure drop across a filter of from 10 kPa to 600 kPa, or 20 kPa 500 kPa, or 30 kPa to 400 kPa, or 40 kPa 80 kPa. Various embodiments are directed system comprising a cationic ion exchange unit using a cationic ion exchanger of a carboxylic acid, aminophosphonic acid, iminodiacetic acid, or sulfonic acid type. Further embodiments are directed to a system comprising a high pressure filtration unit comprising one or more filters. In still further embodiments a high pressure filtration unit comprises a filter (or first filter) having molecular weight cut off less than 200 Da, or less than 100 Da or less than 50 Da, or a pressure drop across a filter (or first filter) of at least 6,000 kPa or at least 7,000 kPa, or at least 8,000 kPa, or at least 9,000 kPa, or at least 10,000 kPa. In even further embodiments a high pressure filtration unit comprises one or more reverse osmosis filters, or a first filter and a second filter, the second filter being upstream of the first filter (i.e. the second filter is placed so that process water reaches the second filter before reaching the first filter). In additional embodiments the high pressure filtration unit comprises a second filter having molecular weight cut-off of between 750 Da and 200 Da or between 500 Da, and 200 Da, or between 400 Da and 200 Da. Still more embodiments are directed to a second filter having pressure drop across the filter of from 1 kPa to 6,000 kPa, or from 100 kPa to 5,000 kPa, or from 1,000 kPa to 4,500 kPa, or 1,300 kPa to 4,100 kPa. Even further embodiments are directed to a second filter being a nanofiltration filter, or to a high pressure filtration unit comprising a nanofiltration filter and a reverse osmosis filter.

Another embodiment is directed to a system further comprising a purification unit coupled between the high pressure filtration unit and a starch process or a storage tank, said purification unit comprising one or more of an activated carbon unit, an irradiation unit, and a low pressure filtration unit. In one or more embodiments of the purification unit the irradiation unit comprises an ultraviolet light source, but may comprise any radiation source suitable for use in a starch process or a starch process water treatment facility. Still other embodiments are directed to a purification unit comprising a low pressure filtration unit having a filter with a pore size of between 1 micron to 0.02 microns, or from 0.7 microns to 0.25 microns, or from 0.5 microns to 0.03 microns, or from 0.4 microns to 0.03 microns or a pressure drop across a filter of from 10 kPa to 600 kPa, or 20 kPa 500 kPa, or 30 kPa to 400 kPa, or 40 kPa 80 kPa.

Still another embodiment is directed to a system comprising a pretreatment unit coupled between the starch process and the membrane bioreactor unit said pretreatment unit comprising one or more of a screening unit, a solids separation unit, and an equalization tank. In some embodiments a solids removal unit is a tilted plate separator.

Another embodiment is directed to a system comprising a membrane bioreactor unit configured to treat process water comprising sodium sulfate from a starch process; a cationic ion exchange unit configured to treat the permeate from the membrane bioreactor unit; and a high pressure filtration unit configured to: receive the permeate from the cationic ion exchange unit; concentrate the sodium sulfate in the permeate from the cationic ion exchange unit to obtain a concentrated sodium sulfate solution having at least 100,000 mg/L sodium sulfate, or at least 150,000 mg/L sodium sulfate, or at least 180,000 mg/L or at least 200,000 mg/L or up to 300,000 mg/L and recycle the concentrated sodium sulfate solution to the starch process. Yet another embodiment is directed to a system further comprising a pretreatment unit configured to obtain process water from a starch process; equalize a chemical oxygen demand and/or phosphorous content of the process water; and provide the process water to a membrane bioreactor unit. Still another embodiment is directed to a system further comprising a purification unit configured to: receive a concentrated sodium sulfate solution; purify the concentrated sodium sulfate solution by at least reducing a chemical oxygen demand of said solution to less than less than 150 mg($O_2$)/L, or less than 100 mg($O_2$)/L, or less than 70 mg($O_2$)/L, or less than 50 mg($O_2$)/L; and recycle said solution to a starch process.

Another embodiment is directed to a system comprising a membrane bioreactor unit configured to treat process water from a starch process by a direct or indirect coupling to the starch process. In one or more embodiments a membrane bioreactor unit is configured to treat process water by reducing organic content (or chemical oxygen demand) in the process water. In various embodiments a membrane bioreactor unit is configured to reduce the chemical oxygen demand from at least 1,000 mg($O_2$)/L or at least 10,000 mg($O_2$)/L, or at least 16,000 mg($O_2$)/L, or up to about 30,000 mg($O_2$)/L to less than about 250 mg($O_2$)/L. Still other embodiments are directed to a membrane bioreactor unit configured to treat process water from a starch process by comprising one or more of a membrane bioreactor membrane, an aerated bioreactor, and a low pressure filter unit. In various embodiments a membrane bioreactor unit is configured to treat process water by using a membrane bioreactor membrane having one of a tubular, spiral, hollow fiber, or flat sheet configuration. Still yet further embodiments are directed to a membrane bioreactor unit configured to treat process water by using an aerated bioreactor unit configured to break down organic content in process water using bacteria, enzyme, or chemical reactants appropriate to break down the organic matter in the process water. Even still other embodiments are directed to a membrane bioreactor unit configured to treat process water by using a low pressure filtration unit having a filter having a pore size of between 1 micron to 0.02 microns, or from 0.7 microns to 0.25 microns, or from 0.5 microns to 0.03 microns, or from 0.4 microns to 0.03 microns, and/or having a pressure drop across a filter of from 10 kPa to 600 kPa, or 20 kPa 500 kPa, or 30 kPa to 400 kPa, or 40 kPa 80 kPa. Even another embodiment is directed to a membrane bioreactor unit comprising an aerated bioreactor unit, a membrane bioreactor membrane and a low pressure filtration unit configured so that i) an aerated bioreactor unit breaks down organic material in process water from a starch process, and the membrane bioreactor membrane and/or low pressure filter unit remove broken down organic content and ii) the chemical oxygen demand of the permeate from the membrane bioreactor unit is less than 250 mg($O_2$)/L. Still another embodiment is directed to a membrane bioreactor unit that is configured to remove organic content from process water so that organic content is less likely to foul downstream filters within a system, including but not limited to nanomembrane filters and/or reverse osmosis filters.

Another embodiment is directed to a system comprising a cationic ion exchange unit configured to treat permeate from a membrane bioreactor by being directly or indirectly coupled to the membrane bioreactor unit. Other embodiments are directed to a cationic ion exchange unit configured to treat a permeate from a membrane bioreactor unit by removing divalent cations (e.g. calcium or magnesium ions) from the permeate: such cations may occur naturally within in the water used in the starch process and/or may be added as processing aids in the starch process (e.g. calcium carbonate). Still other embodiments are directed to a cationic ion exchange unit configured to reduce the divalent cationic content of a permeate from a membrane bioreactor unit from at least 50 mg/L, or at least 75 mg/L, or at least 100 mg/L, or at least 150 mg/L to below 1 mg/L. Yet still other embodiments are directed to a cationic ion exchange unit configured to remove divalent cationic content from the permeate of a membrane bioreactor unit so that divalent cations are less likely to foul downstream filters within a system, including but not limited to nanomembrane filters and/or reverse osmosis filters. In one or more embodiments a cationic ion exchange unit is configured to treat a permeate from a membrane bioreactor unit by having one of a carboxylic acid, an aminophosphonic acid, an iminodiacetic acid, or a sulfonic acid type cationic ion exchanger.

Another embodiment is directed to a system comprising a high pressure filtration unit configured to receive a permeate from a cationic ion exchange unit; to concentrate sodium sulfate in said permeate to obtain a concentrated sodium sulfate solution comprising at least 100,000 mg/L, or at least 150,000 mg/L, or 180,000 mg/L, or 200,000 mg/L, or up to about 300,000 mg/L sodium sulfate; and recycle the concentrated sodium sulfate solution to the starch process by being directly or indirectly coupled to both a cationic ion exchange unit and a starch process. In some embodiments a high pressure filtration system is configured to concentrate sodium sulfate in a permeate from a cationic ion exchange unit by retaining sodium sulfate in a retentate and releasing a permeate comprising less than 500 mg/L sodium sulfate, or less than 235 mg/L sodium sulfate. In some other embodiments a high pressure filtration system is configured to obtain a concentrated sodium sulfate from a permeate of a cationic ion exchange unit by i) retaining sodium sulfate in a first retentate and releasing a first permeate comprising less than 500 mg/L sodium sulfate, or less than 235 mg/L sodium sulfate and further concentrating sodium sulfate in said first retentate by retaining sodium sulfate in a second retentate and releasing a second permeate comprising less than 500 mg/L sodium sulfate, or less than 235 mg/L sodium sulfate. In various embodiments a high pressure filtration unit is configured to obtain a concentrated sodium sulfate solution by i) using one or more filters (or a first filter) having a molecular weight cut off less than 200 Da, or less than 100 Da or less than 50 Da, and all cut offs in between, and/or, ii) having a pressure drop across one or more filters of at least 6,000 kPa or at least 7,000 kPa, 7,000 kPa, or at least 8,000 kPa, or at least 9,000 kPa, or at least 10,000 kPa, and/or iii) using one or more reverse osmosis filters. In some other embodiments a high pressure filtration system is configured to obtain a concentrated sodium sulfate solution by i) using a second filter, upstream from a first filter, having molecular weight cut-off of between 750 Da and 200 Da, or between 500 Da and 200 Da, or between 400 Da and 200 Da, and/or ii) having a pressure drop across a filter of from 1 kPa to 6,000 kPa, or from 100 kPa to 5,000 kPa, or from 1,000 kPa to 4,500 kPa, or 1,300 kPa to 4,100 kPa, and/or iii) being a nanofiltration filter. In still other embodiments a high pressure filtration unit is configured to obtain a concentrated sodium sulfate solution from a permeate of a cationic ion exchange unit by forming a dilute sodium sulfate solution (or first retentate) having a sodium sulfate concentration of between 70,000 mg/L and 80,000 mg/L, and by obtaining from the dilute sodium sulfate solution the concentrated sodium sulfate solution (or second retentate). Yet still other embodiments are directed to a high pressure filtration system configure to obtain a concentrated sodium sulfate solution from a permeate of a cationic exchange unit by using a first and a second filter (the second filter being upstream of the first) and obtaining a dilute sodium sulfate solution using said second filter, and obtaining a concentrated sodium sulfate solution using said first filter. Yet still another embodiment is directed to a high pressure filtration unit configured to i) receive a permeate from a cationic ion exchange unit; ii) concentrate the sodium sulfate in said permeate using a second filter or nanofiltration filter to obtain a dilute sodium sulfate solution having a sodium sulfate content of between 70,000 mg/L and 80,000 mg/L; iii) concentrate the sodium sulfate in said dilute sodium sulfate solution using a first filter or reverse osmosis filter to obtain a the concentrated sodium sulfate solution, said solution having a sodium sulfate concentration of at least 100,000 mg/L, at least 150,000 mg/L, or at least 180,000 mg/L, or at least 200,000 mg/L, or up to about 300,000 mg/L; and iv) provide the concentrated sodium sulfate solution to a starch process.

Another embodiment is directed to a system further comprising a pretreatment unit configured to obtain process water from a starch process; equalize a chemical oxygen demand or phosphorous content of the process water; and provide the process water to a membrane bioreactor unit by being directly or indirectly coupled to the starch process and the membrane bioreactor unit. Other embodiments are directed to a pretreatment unit configured to equalize phosphorous content and/or organic content at least by reducing the likelihood of intermittently high levels (or spikes) of phosphorous and/or organic content in the process water provided to the membrane bioreactor unit. In one or more embodiments a pretreatment unit is configured to equalize a phosphorous content and/or organic content in the process water by comprising one or more of a screening unit, a solids separation unit, and an equalization tank. In various other embodiments a pretreatment unit is configured to equalize a phosphorous content and/or organic content in the process water by comprising an equalization tank configured to receive process water, and equalize at least the phosphorous and/or organic content of the process water and provide the process water to the membrane bioreactor unit. In still other embodiments a pretreatment unit is further configured to remove solid content from process water using a screening unit and a solids separation unit. In yet still other embodiments a pretreatment unit is further configured to protect downstream units in a system from contamination from solid particles.

Still another embodiment is directed to system comprising a purification unit configured to receive a concentrated sodium sulfate solution from a high pressure filtration unit, purify a concentrated sodium sulfate solution, and provide the concentrated sodium sulfate solution to a starch process by being directly or indirectly coupled to a high pressure filtration unit and a starch process. Other embodiments are directed to a purification unit configured to purify a concentrated sodium sulfate solution by comprising one or more of an activated carbon unit, an irradiation unit, and a low pressure filtration unit. In various embodiments the purification unit is configured to purify a concentrated sodium sulfate solution by comprising an activated carbon unit configured to remove from odor, and/or flavor and/or color causing compounds from the concentrated sodium sulfate solution, said compounds including but not being limited to chloride ions and/or volatile organic chemicals. In other embodiments a purification unit is configured to purify a concentrated sodium sulfate solution by comprising an irradiation unit configured to kill or denature bacterial and/or organic content in the solution. In still other embodiments an irradiation unit is an ultraviolet light unit, or radiation emitting unit suitable for use in a starch process or to treat process water. In yet still other embodiments a purification unit is configured to purify a concentrated sodium sulfate solution by comprising a low pressure filtration unit configured to reduce the chemical oxygen demand of the solution to less than 150 mg($O_2$)/L, or less than 100 mg($O_2$)/L, or less than 70 mg($O_2$)/L, or less than 50 mg($O_2$)/L. In one or more embodiments a low pressure filtration unit configured to reduce the chemical oxygen demand of the concentrated sodium sulfate solution by using a filter having a pore size of between 1 micron to 0.02 microns, or from 0.7 microns to 0.25 microns, or from 0.5 microns to 0.03 microns, or from 0.4 microns to 0.03 microns, or by having a pressure drop across a filter of from 10 kPa to 600 kPa, or 20 kPa 500 kPa, or 30 kPa to 400 kPa, or 40 kPa 80 kPa.

Another embodiment is directed to a method for treating process water from a starch process comprising sodium sulfate in order to recycle to the starch process a concentrated sodium sulfate solution having at least 100,000 mg/L, or at least 150,000 mg/L, or at least 180,000 mg/L, or at least 200,000 mg/L, or up to about 300,000 mg/L sodium sulfate content. Yet another embodiment is directed to a method for treating process water from a starch process comprising sodium sulfate in order to obtain a sodium sulfate solution that is sufficiently concentrated to be recycled to a starch process for example sufficiently concentrated to recycle between 0.1% and 30% sodium sulfate by weight of the starch to the process or, between 5% and 30%, or about 10%, or about 15%, or about 18%, or about 20% sodium sulfate by weight of the starch. Still another embodiment is directed to a method for treating process water from a starch, said process water initially comprising a sodium sulfate content of at least 500 mg/L and one or more of a chemical oxygen demand of least 1,000 mg($O_2$)/L, or at least 10,000 mg($O_2$)/L, or between 1,000 mg($O_2$)/L and 30,000 mg($O_2$)/L, or between 10,000 mg($O_2$)/L and 16,000 mg($O_2$)/L; and a divalent cationic content of at least 50 mg/L, or at least 75 mg/L, or at least 100 mg/L, or at least 150 mg/L to obtain a concentrated sodium sulfate solution, and to recycle the said solution to the starch process. In one more embodiments of the method, the process starch process is a hydroxypropylation and/or crosslinking-linking process. Further embodiments are directed a method for treating process water from a starch process to obtain a sodium sulfate solution and to recycle sodium sulfate in said solution one or more times, or at least 2 times, or at least 3 times, or at least 4 times, or at least 5 times. Still another embodiment is directed to a method treating process water from a starch process to obtain a concentrated sodium sulfate solution having a chemical oxygen demand of less than 150 mg($O_2$)/L, or less than 100 mg($O_2$)/L, or less than 70 mg($O_2$)/L, or less than 50 mg($O_2$)/L and/or a divalent cation content of less than 1 mg/L. Still even another embodiment is directed to a method for treating process water from a starch process to obtain concentrated sodium sulfate solution after recycling the sodium sulfate into the starch process at least 5 times having one or more of less than 0.04% or less than 0.010% phosphorus by weight; or less than 7.0 or less than 4.0, or less than 3.5 hydroxypropyl groups (g/100 g sodium sulfate); or less than 1.0, or less than 0.5, or less than 0.2 propylene chlorohydrin (mg/kg sodium sulfate), or less than 3.0, or less than 2.7 sulfur dioxide (mg/kg sodium sulfate); or less than 0.5, or less than 0.05 arsenic (mg/kg sodium sulfate). Another embodiments is directed to a method of treating process water from a starch process comprising sodium sulfate in order to recycle a concentrated sodium sulfate solution to the starch process and to release a permeate having a sodium sulfate content of less than 500 mg/L or less than 235 mg/L.

Another embodiment is directed to a method for treating process water comprising obtaining a process water from a starch process; and treating the process water in a membrane bioreactor unit; treating the permeate from membrane bioreactor unit in a cationic ion exchange unit; and concentrating the permeate from the cationic ion exchange unit in a high pressure filtration unit to obtain a concentrated sodium sulfate solution having a sodium sulfate content of at least 100,000 mg/L, or at least 150,000 mg/L, or at least 180,000 mg/L, or at least 200,000 mg/L, or up to about 300,000 mg/L and recycling the concentrated sodium sulfate solution into the starch process. Another embodiment is directed a method further comprising discharging from the high pressure filtration unit a permeate having a sodium sulfate content of less than 500 mg/L or less than 235 mg/L. Still another embodiment is directed to a method further comprising concentrating the sodium sulfate in the permeate from the cationic ion exchange unit to obtain a dilute sodium sulfate solution having a sodium sulfate content of between 70,000 mg/L and 80,000 mg/L and the further concentrating the sodium sulfate in the dilute sodium sulfate solution to obtain a concentrated sodium sulfate solution. Still even another embodiment comprises concentrating a permeate from the cationic ion exchange unit using a one or more filters, or a first and second filter, or a nanofiltration filter and a reverse osmosis filter, to obtain a dilute sodium sulfate solution and concentrating the sodium sulfate in the dilute sodium sulfate solution to obtain a concentrated sodium sulfate solution. A further embodiment is directed to a method further comprising purifying a concentrated sodium sulfate solution. A still further embodiment is directed to a method further comprising purifying the concentrated sodium sulfate solution such that it has a chemical oxygen demand of less than 150 mg($O_2$)/L, or less than 100 mg($O_2$)/L, or less than 70 mg($O_2$)/L, or less than 50 mg($O_2$)/L, and the purifying step optionally further comprises removing colors and flavors from the concentrated sodium sulfate solution and/or irradiating the concentrated sodium sulfate solution. Yet a further embodiment is directed to a method further comprising pretreating the process water before said water is treated in a membrane bioreactor unit. Yet still a further embodiment is directed to a method wherein the pretreatment step comprises providing to the membrane bioreactor unit process water having equalized chemical oxygen demand and/or phosphate content, and optionally further comprises one or more steps to remove solid content from the process water. Yet even a further embodiment is directed to a method for treating the process water from a starch hydroxypropylation process. In an embodiment the above described method is run at between 15° C. and 45° C. or at between 20° C. and 40° C. The concentrated sodium sulfate solution has a pH of between 6 and 9

Reference in this specification to a "starch process" means any sequence of steps use modify a starch. While in some embodiments a starch process is described as a hydroxypropylation process or a hydroxypropylation and crosslinking process, starch process is not so limited. It includes any physical, enzymatic, or chemical process that uses sodium sulfate for some purpose in the process water, and for which it would be useful to retain and recycle a source of sodium sulfate in the process.

Reference within this specification to "process water" means an aqueous mixture, whether being a solution, slurry, or dispersion that comprise sodium sulfate and all other moieties present during a starch process whether added to or otherwise present in the mixture, such moieties include catalysts, reactants, and adjuvants, but may also include contaminants or other moieties present in the mixture.

Use of "about" to modify a number in this specification is meant to include the number recited plus or minus 10%. Where legally permissible recitation of a value in a claim means about the value. Use of about in a claim or in the specification is not intended to limit the full scope of covered equivalents.

Recitation of the indefinite article "a" or the definite article "the" in this specification is meant to mean one or more unless the context clearly dictates otherwise.

While certain embodiments have been illustrated and described, a person with ordinary skill in the art, after reading the foregoing specification, can effect changes, substitutions of equivalents and other types of alterations to the methods. Each aspect and embodiment described above can also have included or incorporated therewith such variations or aspects as disclosed regarding any or all the other aspects and embodiments.

The present technology is also not to be limited in terms of the aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to methods, conjugates, reagents, compounds, compositions, labeled compounds or biological systems, which can, of course, vary. All methods described herein can be performed in any suitable order unless otherwise indicated herein or otherwise clearly contradicted by context. It is also to be understood that the terminology used herein is for the purpose of describing aspects only and is not intended to be limiting. Thus, it is intended that the specification be considered as exemplary only with the breadth, scope and spirit of the present technology indicated only by the appended claims, definitions therein and any equivalents thereof. No language in the specification should be construed as indicating any non-claimed element as essential.

The embodiments illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the technology. This includes the generic description of the technology with a proviso or negative limitation removing any subject matter from the genus, regardless of whether the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member, and each separate value is incorporated into the specification as if it were individually recited herein.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The technology is further described in the following aspects, which are intended to be illustrative, and are not intended to limit the full scope of the claims and their equivalents.

In a first aspect, the technology disclosed in the specification is directed to a system comprising: a membrane bioreactor unit coupled to a starch process; a cationic ion exchange unit coupled to the membrane bioreactor unit; a high pressure filtration unit coupled to the cationic ion exchange unit and the starch process.

In a second aspect, the technology disclosed in this specification is directed to the system of first aspect wherein the high pressure filtration unit comprises a first filter having a molecular weight cut off of less than 200 Da, or less than 100 Da, or less than 50 Da.

In a third aspect, the technology disclosed in this specification is directed to the system of the first or second aspects wherein the high pressure filtration unit comprises a second filter, upstream of the first filter, the second filter having a molecular weight cut-off of between 750 Da and 200 Da, or between 500 Da and 200 Da, or between 400 Da and 200 Da.

In a fourth aspect, the technology disclosed in this specification is directed to the system of any one first to third aspects wherein the membrane bioreactor unit comprises one or more of an aerated bioreactor unit, a membrane bioreactor membrane, and a low pressure filter unit.

In a fifth aspect, the technology disclosed in this specification is directed to the system of any one of the first to fourth aspects wherein the membrane bioreactor membrane has one of a tubular, spiral, hollow fiber, or flat sheet configuration.

In a sixth aspect, the technology disclosed in this specification is directed to the system of any one of the first to fifth aspects wherein further comprising a purification unit coupled between a high pressure filtration unit and the starch process.

In a seventh aspect, the technology disclosed in this specification is directed to the system of any one of the first to sixth aspects wherein said purification unit comprises one or more of an activated carbon unit, an irradiation unit, and a low pressure filtration unit.

In an eighth aspect, the technology disclosed in this specification is directed to the system of any one of the first to seventh aspects wherein the low pressure filtration unit comprises a filter having a pore size of between 1 micron to 0.02 microns, or from 0.7 microns to 0.25 microns, or from 0.5 microns to 0.03 microns, or from 0.4 microns to 0.03 microns.

In a ninth aspect, the technology disclosed in this specification is directed to the system of any one of the first to eighth aspects wherein the cationic ion exchange unit is of a carboxylic acid type, aminophosphonic acid type, iminodiacetic acid type, or sulfonic acid type.

In a tenth aspect, the technology disclosed in this specification is directed to the system of any one of the first to ninth aspects further comprising a pretreatment unit coupled between the starch process and the membrane bioreactor unit said pretreatment unit comprising one or more of a screening unit, a solids separation unit, and an equalization tank.

In an eleventh aspect, the technology disclosed in the specification is directed to the system comprising: a membrane bioreactor unit configured to treat process water the process water comprising sodium sulfate and being from a starch process; a cationic ion exchange unit configured to receive the permeate from the membrane bioreactor unit; and a high pressure filtration unit configured to i) receive the permeate from the cationic ion exchange unit, ii) concentrate sodium sulfate in the permeate from the cationic ion exchange unit to obtain a concentrated sodium sulfate solution having at least 100,000 mg/L sodium sulfate, or at least 150,000 mg/L sodium sulfate, or at least 180,000 mg/L, or at least 200,000 mg/L or up to about 300,000 mg/L; and iii) recycle the concentrated sodium sulfate solution to the starch process; and optionally wherein the system further comprises any one of the foregoing aspects.

In a twelfth aspect, the technology disclosed in this specification pertains to the system of the eleventh aspect further comprising a pretreatment unit configured to i) obtain process water from a starch process; ii) equalize a chemical oxygen demand and/or phosphorous content of the process water; and iii) provide the process water to the membrane bioreactor unit.

In a thirteenth aspect, the technology disclosed in this specification pertains to the system of any one of the eleventh or twelfth aspects further comprising a purification configured to: i) receive the concentrated sodium sulfate solution; ii) purify said solution by reducing a carbon oxygen demand of said solution to less than 150 mg($O_2$)/L, or less than 100 mg($O_2$)/L, or less than 70 mg($O_2$)/L, or less than 50 mg($O_2$)/L; and iii) recycle said solution to the starch process.

In a fourteenth aspect, the technology disclosed in this specification pertains to the system of any one of the eleventh to thirteenth aspects wherein the membrane bioreactor unit is configured to treat the process water by reducing the chemical oxygen content of the process water from at least 1,000 mg($O_2$)/L or at least 10,000 mg($O_2$)/L, or at least 16,000 mg($O_2$)/L, or up to about 30,000 mg($O_2$)/L to less than 250 mg($O_2$)/L.

In a fifteenth aspect, the technology disclosed in this specification pertains to the system of any one of the eleventh to fourteenth aspects wherein the membrane bioreactor unit is further configure to break down organic material in the process water using an aerated bioreactor unit; and to reduce the chemical oxygen demand to less than 250 mg($O_2$)/L using one or more of a membrane bioreactor membrane and a low pressure filter unit.

In a sixteenth aspect, the technology disclosed in this specification pertains to the system of any one of the eleventh to fifteenth aspects wherein the high pressure filtration unit is configured to: i) receive the permeate from the cationic ion exchange unit, ii) concentrate the sodium sulfate in the process water to obtain a dilute a sodium sulfate solution having a sodium sulfate content of between 70,000 mg/L and 80,000 mg/L; iii) further concentrate the sodium sulfate in the dilute sodium sulfate solution to obtain the concentrated sodium sulfate solution.

In a seventeenth aspect, the technology disclosed in this specification pertains to the system of any one of the eleventh to sixteenth aspects wherein the high pressure filtration unit is further configured to obtain the dilute sodium sulfate solution and the concentrated sodium sulfate solution by discharging a permeate comprising less than 500 mg/L or less than 235 mg/L sodium sulfate.

In an eighteenth aspect, the technology disclosed in this specification pertains a method comprising: obtaining process water from a starch process; treating the process water in a membrane bioreactor unit; treating the permeate from the membrane bioreactor unit in a cationic ion exchange unit; concentrating the sodium sulfate in the permeate from the cationic ion exchange unit in a high pressure filtration unit to obtain a concentrated sodium sulfate solution having a sodium sulfate content of at least 100,000 mg/L, or at least 150,000 mg/L, or at least 180,000 mg/L or at least 200,000 mg/L, or up to 300,000 mg/L; and recycling the concentrated sodium sulfate solution into the starch process.

In a nineteenth aspect, the technology disclosed in this specification pertains to the method of the eighteenth aspect further comprising reducing the a chemical oxygen demand of the process from at least 1,000 mg($O_2$)/L, or at least 10,000 mg($O_2$)/L or at least 16,000 mg($O_2$)/L, or up to 30,000 mg($O_2$)/L to less than 150 mg($O_2$)/L, or less than 100 mg($O_2$)/L, or less than 70 mg($O_2$)/L, or less than 50 mg($O_2$)/L.

In a twentieth aspect, the technology disclosed in this specification pertains to the method of the eighteenth or nineteenth aspects further comprising discharging a permeate from the high pressure filtration system having a sodium sulfate content of less than 500 mg/L, or less than 235 mg/L.

In a twenty-first aspect, the technology disclosed in this specification pertains to the method of the eighteenth to twentieth aspects further comprising, in a high pressure filtration unit, concentrating the sodium sulfate in the permeate from the cationic ion exchange unit to obtain a dilute sodium sulfate solution having a sodium sulfate content of between 70,000 mg/L and 80,000 mg/L and further concentrating the sodium sulfate in the dilute sodium sulfate solution to obtain the concentrated sodium sulfate solution.

In a twenty-second aspect, the technology disclosed in this specification pertains to the method of the eighteenth to twenty-first aspects wherein the dilute sodium sulfate solution is obtained using a nanofiltration unit, and the concentrated sodium sulfate solution is obtained using a reverse osmosis unit.

In a twenty-third aspect, the technology disclosed in this specification pertains to the method of the eighteenth to twenty-second aspects further comprising purifying the concentrated sodium sulfate solution.

In a twenty-fourth aspect, the technology disclosed in this specification pertains to the method of eighteenth to twenty-third aspects further comprising pretreating the process water prior to treating the process water in the membrane bioreactor unit.

In a twenty-fifth aspect, the technology disclosed in this specification pertains to the method of any one of the eighteenth to twenty-fourth aspects wherein the pretreatment step comprises providing to the membrane bioreactor unit process water having an equalized chemical oxygen demand and/or phosphate content.

In a twenty-sixth aspect, the technology disclosed in this specification pertains to the method of any one of the eighteenth to twenty-fifth aspects wherein the starch process is a hydroxypropylation process.

In a twenty-seventh aspect, the technology disclosed in this specification pertains to the method of any one of the eighteenth to twenty-sixth aspects wherein the sodium sulfate within the concentrated sodium sulfate solution is recycled into the starch processing process more than once.

In a twenty-eighth aspect, the technology disclosed in this specification pertain to the method of any one of the eighteenth to twenty-seventh aspects wherein the sodium sulfate within the concentrated sodium sulfate solution is recycled into the starch processing process at least 5 times.

In a twenty-ninth aspect, the technology disclosed in this specification pertains to the method of any of the eighteenth to twenty-eighth aspects wherein the method is run at between 15° C. and 45° C. or at between 20° C. and 40° C.

In a thirtieth aspect, the technology disclosed in this specification pertains to the method of any of the eighteenth to twenty-ninth aspects wherein the concentrated sodium sulfate solution has a pH of between 6 and 9.

In a thirty-first aspect, the technology disclosed in this specification pertains to a method of making a modified starch according to the method described or using the system described in any one of the foregoing aspects.

In a thirty-second aspect, the technology disclosed in this specification pertains to a method of making a modified starch as using any method or system described in the any one of the foregoing aspects wherein the modification comprises hydroxypropylation.

In a thirty-second aspect, the technology disclosed in this specification pertains to a method of making a modified starch as using any method or system described in the any one of the foregoing aspects wherein the modification comprises hydroxypropylation and crosslinking.

The invention is further described by reference to the following examples, which are provided for illustrative purposes and are not limiting in any way. A person of ordinary skill in the art would understand that variations can be made to the Examples that would be within the scope of the claims.

Examples—Measurement of Contaminant Levels of Recycled Sodium Sulfate

All samples are measured against starch purity standards defined in the Chinese National GB Standard for hydroxypropylated starch (GB 29931).

Table 1 compares the level of various restrict chemical moieties against the GB standard for an embodiment of the starch treatment system method that does not use a purification unit to purify the concentrated sodium sulfate solution.

TABLE 1

Various Chemical Moieties in Unpurified Sodium Sulfate Solution

|  | GB Standard | Test result |
|---|---|---|
| Total Phosphorus (%) | ≤0.04 | 0.0069 |
| Total Arsenic (mg/kg) | ≤0.5 | <0.01 |
| Sulfur Dioxide (mg/kg) | ≤30 | <0.1 |
| Hydroxypropyl Groups (g/100 g) | ≤7.0 | 0.025 |
| Propylene Chlorohydrin (mg/kg) | ≤1.0 | <0.10 |

Table 2 compares the level of various restrict chemical moieties against the GB standard. Samples R1 through R5 report the number of cycles the sodium sulfate has been through—i.e. R1 is one treatment cycle, R2 is two treatment cycles, etc. As shown, over 5 cycles, the level of restricted moieties never exceeded the standard, and generally did not increase.

TABLE 2

Level of Various Chemical Moieties after Recycling Sodium Sulfate

|  | R1 | R2 | R3 | R4 | R5 | GB Standard |
|---|---|---|---|---|---|---|
| Total Phosphorus, % | 0.008 | 0.006 | 0.006 | 0.006 | 0.007 | 0.04 max |
| Hydroxypropyl Groups, g/100g | 4.02 | 3.09 | 3.65 | 3.65 | 3.33 | 7.0 max |
| Propylene Chlorohydrin, mg/kg | 0.1 | 0.51 | 0.21 | 0.20 | 0.17 | 1.0 max |
| Sulfur Dioxide, mg/kg | <2.7 | <2.7 | <2.7 | <2.7 | <2.7 | 30 max |
| Arsenic (as As) mg/kg | <0.05 | <0.05 | <0.05 | <0.05 | <0.05 | 0.5 max |

What is claimed is:

1. A system comprising:
(a) a membrane bioreactor unit configured to treat process water, the process water comprising sodium sulfate, being from a starch process and having a chemical oxygen content at least 1000 mg($O_2$/L), the membrane bioreactor by being configured to reduce the chemical oxygen content of the process to less than 250 mg($O_2$)/L;
(b) a cationic ion exchange unit configured to receive the permeate from the membrane bioreactor unit; and
(c) a high pressure filtration unit configured to: i) receive the permeate from the cationic ion exchange unit, ii) concentrate sodium sulfate in the permeate from the cationic ion exchange unit to obtain a concentrated sodium sulfate solution having at least 100,000 mg/L sodium sulfate; and iii) recycle the concentrated sodium sulfate solution to the starch process
wherein the high pressure filtration unit has a molecular weight cut off of less than 200 Da.

2. The system of claim 1 wherein the high pressure filtration unit is further configured to concentrate the sodium sulfate in the permeate from the cationic ion exchange unit using a first filter to obtain a dilute a sodium sulfate solution having a sodium sulfate content of between 70,000 mg/L and 80,000 mg/L; and concentrate the dilute dilute sodium sulfate solution to obtain the concentrated sodium sulfate solution.

3. The system of claim 1 wherein the high pressure filtration unit is further configured to discharge a filtration unit permeate having sodium sulfate content of less than 500 mg/L sodium sulfate.

4. A method comprising:
obtaining process water from a starch process;
treating the process water in a membrane bioreactor unit;
treating the permeate from the membrane bioreactor unit in a cationic ion exchange unit;
concentrating the sodium sulfate in the permeate from the cationic ion exchange unit in a high pressure filtration unit to obtain a concentrated sodium sulfate solution having a sodium sulfate content of at least 100,000 mg/L; and
recycling the concentrated sodium sulfate solution into the starch process
wherein the high pressure filtration unit has a molecular weight cutoff less than 200 Da.

5. The method of claim 4 further comprising reducing a chemical oxygen demand of the process water from at least 1,000 mg($O_2$)/L, to less than 150 mg($O_2$)/L.

6. The method of claim 4 further comprising discharging a permeate from the high pressure filtration system having a sodium sulfate content of less than 500 mg/L.

7. The method of claim 4 further comprising, in the high pressure filtration unit, concentrating the sodium sulfate in the permeate from the cationic ion exchange unit to obtain a dilute sodium sulfate solution having a sodium sulfate content of between 70,000 mg/L and 80,000 mg/L and further concentrating the sodium sulfate in the dilute sodium sulfate solution to obtain the concentrated sodium sulfate solution.

8. The method of claim 4 further comprising purifying the concentrated sodium sulfate solution.

9. The method of claim 4 further comprising pretreating the process water prior to treating the process water in the membrane bioreactor unit.

10. The method of claim 4 wherein the starch process is a hydroxypropylation process.

11. The method of claim 4 wherein the sodium sulfate within the concentrated sodium sulfate solution is recycled into the starch processing process more than once.

12. The method of claim 4 wherein the sodium sulfate within the concentrated sodium sulfate solution is recycled into the starch processing process more at least 5 times.

13. The method of claim 4 wherein the sodium sulfate within the concentrated sodium sulfate solution is recycled into the starch processing process at least 5 times.

14. The method of claim 4 wherein the method is run at between 15° C. and 45° C.

15. The method of claim 4 wherein the concentrated sodium sulfate solution has a pH of between 6 and 9.

16. The system of claim 1 wherein the molecular weight cutoff of the high-pressure filter is less than 100 Da.

17. The method of claim 4 wherein the molecular weight cutoff of the high-pressure filter is less than 100 Da.

* * * * *